United States Patent
Capik et al.

(10) Patent No.: US 6,567,575 B1
(45) Date of Patent: May 20, 2003

(54) METHOD AND APPARATUS FOR DETERMINING LOSS PARAMETERS FOR OPTICAL CROSS-CONNECTS

(75) Inventors: Ronald J. Capik, Fords, NJ (US); John P. Hickey, Oceanport, NJ (US); Steven K. Korotky, Toms River, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 114 days.

(21) Appl. No.: 09/676,390

(22) Filed: Sep. 29, 2000

Related U.S. Application Data
(60) Provisional application No. 60/186,776, filed on Mar. 3, 2000.

(51) Int. Cl.[7] .............................. G01N 21/00; G02B 6/35
(52) U.S. Cl. ........................................ 385/17; 356/73.1
(58) Field of Search ............................. 385/16–18, 140; 359/128; 356/73.1

(56) References Cited

U.S. PATENT DOCUMENTS

| | | | |
|---|---|---|---|
| 5,206,497 A | 4/1993 | Lee | 250/201.1 |
| 5,623,563 A * | 4/1997 | Anderson et al. | 385/147 |
| 5,862,250 A * | 1/1999 | Csipkes et al. | 356/73.1 |
| 6,289,145 B1 * | 9/2001 | Solgaard et al. | 385/17 |

OTHER PUBLICATIONS

Lee et al. "Demonstration of a Very Low–Loss, 576x576 Servo–Controlled, Beam–Steering Optical Switch Fabric", 26th European Conference on Optical Communication, Munich, Germany, Sep. 3–7, 2000.

* cited by examiner

*Primary Examiner*—Hemang Sanghavi
*Assistant Examiner*—Omar Rojas
(74) *Attorney, Agent, or Firm*—Moser, Patterson & Sheridan L.L.P.

(57) ABSTRACT

A method and apparatus for deriving insertion losses for connections in a single-stage optical cross-connect. The optical cross-connect comprises a number (N) of input ports, a number (M) of output ports and an on-board controller. A memory is provided on the on-board controller for storing N loss parameters for the N input ports and M loss parameters for the M output ports. A modeled insertion loss for a connection between any input port and any output port can be derived from the loss parameters associated with the input and output ports.

20 Claims, 4 Drawing Sheets

$I_{74} = 1_7 + 1_4$ $I_{74} = l_7 + l_4$

METHOD AND APPARATUS FOR DETERMINING LOSS PARAMETERS FOR OPTICAL CROSS-CONNECTS

CROSS REFERENCE TO RELATED APPLICATIONS

This application claims benefit of a U.S. provisional application, Ser. No. 60/186,776, entitled "METHOD FOR EXTRACTING INPUT AND OUTPUT LOSS PARAMETERS FOR SINGLE-STAGE OPTICAL CROSS-CONNECTS," filed on Mar. 3, 2000, which is incorporated herein by reference in its entirety.

FIELD OF THE INVENTION

The invention relates generally to an optical communication system and, more particularly, to a method and apparatus for determining loss parameters for optical cross-connects.

BACKGROUND OF THE INVENTION

The use of optical switches in communication networks offers several advantages over conventional electrical switches. For example, optical switches provide connections with reduced insertion loss, high connection-to-connection isolation, relatively fast reconfiguration speed and high degree of bit rate and format independence. Optical cross-connects, which function as optical switches, also allow dynamic wavelength routing within a communication network. There are currently only a few optical switching technologies that are practical for achieving relatively high port counts, e.g., in a range of about 100×100 to 1000×1000, among which are those based on free-space beam-steering optics.

Beam-steering switches are capable of providing a large number of connections with a single stage because each of the individual input and output ports may be configured to a very large number of states—e.g., an optical beam from a specific input port may be steered to different angles, thus directing the beam to a large number of output ports. This is in sharp contrast with other N×N optical switches built up from either 1×2 or 2×2 multi-stage optical crosspoint elements or 2-stage N×N switches based on 1×N switches, which require both a large number of elements (~$N\log_2 N$ to $N^2$) and many switching stages. However, to achieve a high degree of accuracy in angular positioning of the optical beam for beam-steering, some form of feedback is necessary to ensure reliable connections between input and output ports.

One way of targeting and verifying an optical connection is to measure an insertion loss obtained for a particular connection, and compare it to a reference insertion loss associated with that connection. For an optical cross-connect with N input ports and M output ports, for example, existing connection algorithms using reference insertion loss values store the loss parameters in a table with individual entries for each of the possible N×M connections within on board memory in controllers. It should be noted that the number of input ports (N) and the number of output ports (M) may be, but does not have to be, equal to each other.

SUMMARY OF THE INVENTION

The invention provides generally a method and an apparatus for deriving insertion losses for connections within a single-stage optical cross-connect. In one aspect of the invention, a reduced set of loss parameters, each associated with an individual input or output port, is used to derive insertion losses for connections between any one of the input ports and any one of the output ports. In another aspect of the invention, an apparatus comprises a controller and the reduced set of loss parameters is stored in a memory of the controller. The controller allows insertion losses between any one of the input ports and any one of the output ports to be calculated from the reduced set of loss parameters.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention provides generally a method and apparatus for determining insertion loss parameters for an optical cross-connect. For an optical cross-connect having N input ports and M output ports, existing connection algorithms require a complete insertion loss table that contains N×M entries. According to one aspect of the invention, a method is provided such that modeled insertion losses may be derived from a reduced set of loss parameters. With a reduction in memory capacity requirements, such a loss parameter database can readily be stored in on-board controllers. The invention is especially advantageous for optical cross-connects with large number of port counts.

Figure 1:
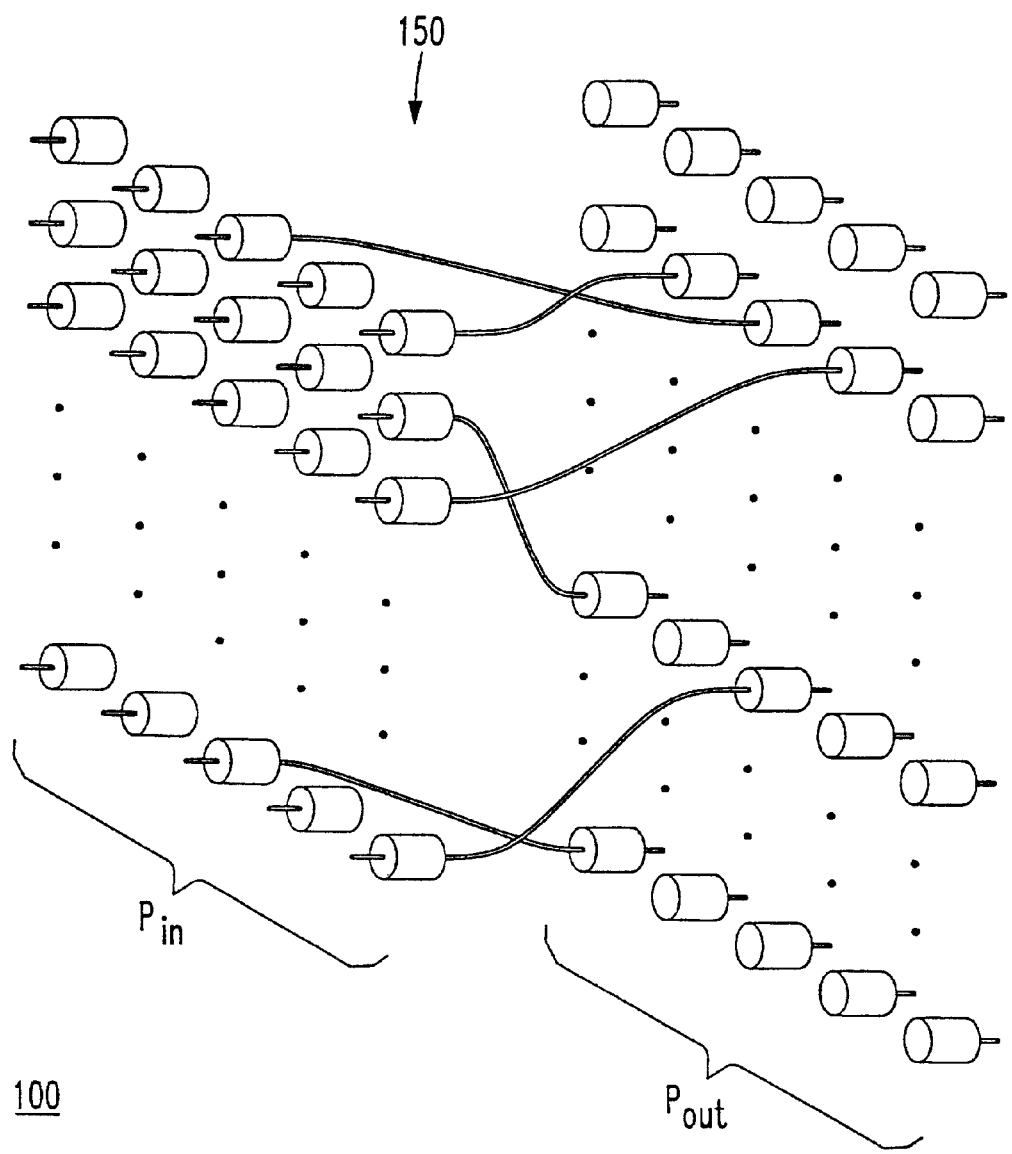
FIG. 1 depicts a schematic representation of a beam-steering optical switch.

FIG. 1 is a schematic illustration of a single-stage optical cross-connect 100 having a number of input ports $P_{in}$ and a number of output ports $P_{out}$. In this example, the input and output ports $P_{in}$ and $P_{out}$ are arranged in two-dimensional arrays, with a free-space region 150 in between. Each of the input ports $P_{in}$ can be connected to each of the output ports $P_{out}$, and the number of possible connections is given by the product of the number of input ports $P_{in}$ and the number of output ports $P_{out}$. One embodiment of the optical cross-connect 100 is based on servo-controlled fiber-collimator-lens assemblies, which are made up of input or output fibers coupled to respective collimator lenses. Connections are made in such an optical cross-connect by addressing an input port to direct an optical beam to a desired output port, and addressing the desired output port to steer and receive the optical beam from the specific input port. Description of a servo-controlled, beam-steering optical switch can be found in "Demonstration of a Very Low-Loss, 576×576 Servo-Controlled, Beam-Steering Optical Switch Fabric," (presented at 26th European Conference on Optical Communication, Sept. 3–7, 2000, Munich, Germany) and in U.S. Pat. No. 5,206,497, entitled "Free-Space Optical Switching Apparatus," issued on Apr. 27, 1993, both of which are incorporated herein by reference.

Figure 2:
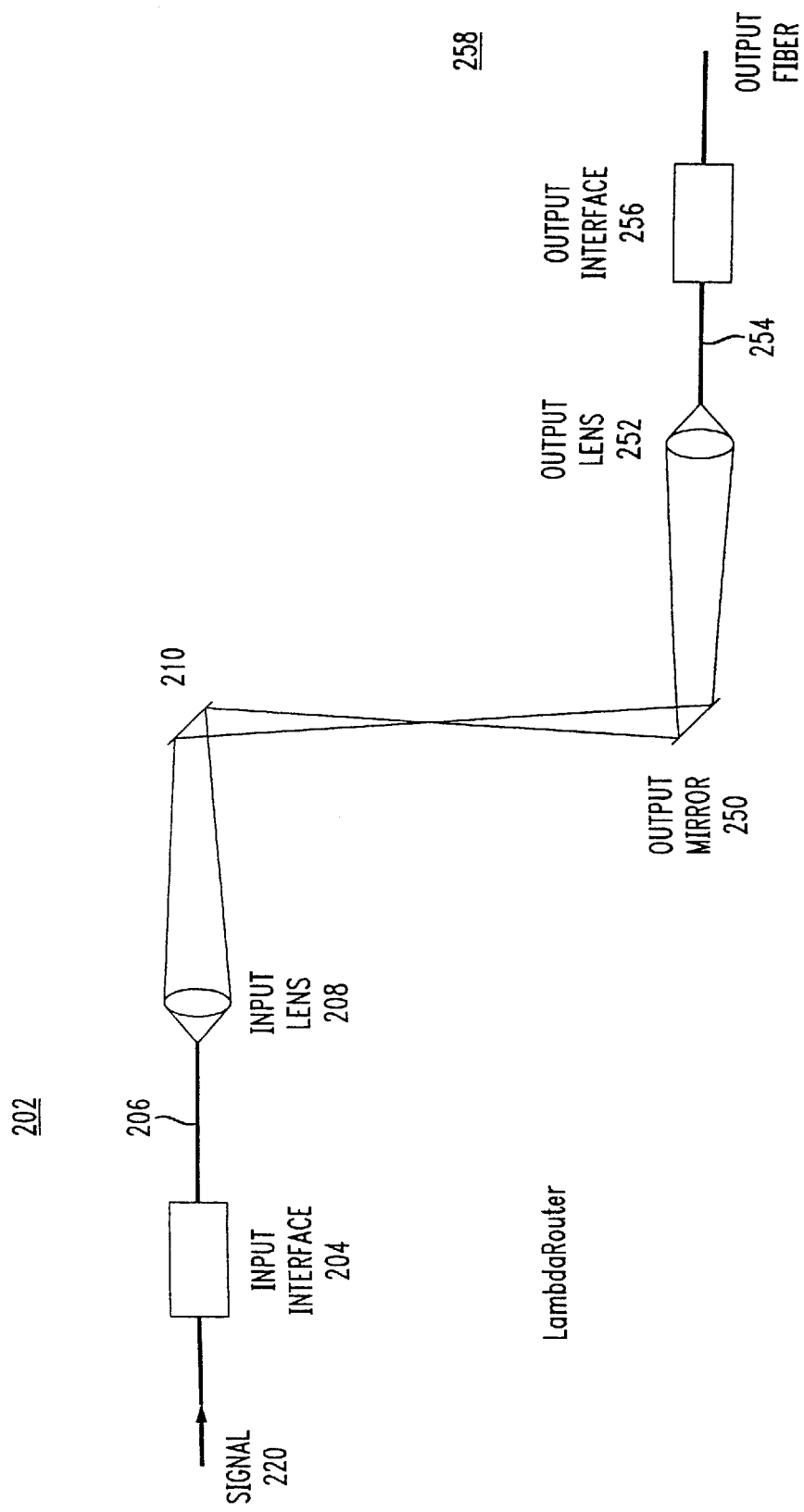
FIG. 2 is a schematic representation of an optical path through a beam-steering optical switch based on steerable mirrors.

FIG. 2 is a schematic representation of an optical path between an input port 202 and an output port 258 of a beam-steering optical switch 200 based on steerable mirrors, such as the MicroStar™ technology used in the WaveStar™ LambdaRouter™ of Lucent Technologies, Inc., of Murray Hill, N.J.

A transmission signal 220 entering the input port 202 is coupled via an input interface 204 to an input fiber 206. The transmission signal 220 is then coupled to an input lens 208 for collimation onto an input mirror 210. The input mirror 210 is steerable, such that its angle can be adjusted to direct the transmission signal 220 to an output mirror 250 of the output port 258. The transmission signal 220 from the output mirror 250 is then coupled into an output fiber 254 by an output lens 252 by steering the output mirror 250, and exits the output port 258 via the output interface 256. Depending on the specific applications, the input and output interfaces 204 and 256 may comprise various optical and electronic components such as transmitter, receiver, amplifier, or electronic circuits.

Each connection (or path) between any input port and any output port of the optical cross-connect 200 has an associated optical insertion loss, which represents a loss in the transmitted optical power as the light beam traverses the optical path. The insertion loss measured in dB for a given connection can be represented by a sum of three terms:

$$I_{ij}=l_i+l_j+\epsilon_{ij};\qquad\text{Equation (1)}$$

where $I_{ij}$ is an optical insertion loss, in dB, for a connection in a single-stage switch between an $i^{th}$ input port and a $j^{th}$ output port;

$l_i$ is a loss term associated with the $i^{th}$ input port;

$l_j$ is a loss term associated with the $j^{th}$ output port; and $\epsilon_{ij}$ is a loss term associated with the specific connection between the $i^{th}$ input and the $j^{th}$ output ports.

The insertion loss $I_{ij}$, as represented in Equation (1), may further be considered as having two components: a connection-dependent and a connection-independent component. The connection-independent components include loss terms that can be assigned to either the input or the output ports, e.g., $l_i$ and $l_j$, because their values are not affected by the specific connection between the $i^{th}$ input port and the $j^{th}$ output port. Contributions to $l_i$ and $l_j$ may originate from several sources, such as facility interface losses, e.g., tap and connector losses and monitor detector efficiencies, or those attributable to specific optical components such as losses from mirrors, lenses, and apertures, and may also include losses associated with deviation from ideal focus or diffraction losses, among others.

The term $\epsilon_{ij}$ in Equation (1) corresponds to the connection-dependent component, which may arise from distortions in the optical beam propagating between the specific input and output ports.

In one embodiment, the $\epsilon_{ij}$ term is assumed to be negligible, and the insertion loss $I_{ij}$ for a connection between the $i^{th}$ input port and the $j^{th}$ output port can be approximated by:

$$I_{ij}=l_i+l_j\qquad\text{Equation (2)}$$

Thus, according to one aspect of the invention, the insertion losses for each of the possible N×M connections in an optical cross-connect having N input ports and M output ports can be obtained by summing the loss parameters ($l_i$ and $l_j$) for each of the N input ports with those for each of the M output ports.

Instead of the conventional practice of storing N×M insertion losses on an onboard controller, a loss table having only N+M parameters can be used for extracting insertion losses for all the connections in the optical cross-connect. That is, a database reduction by a factor of N×M/(N+M) can be achieved.

In one embodiment where the number of input ports equals the number of output ports (i.e., N=M), the loss table may be reduced in size by a factor of N/2. This reduction in the size of the loss table may be significant for cross-connects with large port counts, and can greatly facilitate data storage in onboard controllers by reducing the required memory capacity.

Furthermore, it can be shown that the loss parameter associated with the $i^{th}$ input port ($l_i$), which is related to experimentally measured insertion losses, may be expressed as:

$$l_i=\langle I_{ik}^e\rangle-(\tfrac{1}{2})\langle I_{kl}^e\rangle\qquad\text{Equation (3)}$$

The first term $\langle I_{ik}^e\rangle$ in Equation (3) corresponds to an average, or expectation value for the experimental insertion losses that are common to the $i^{th}$ input port. For example, $\langle I_{ik}^e\rangle$ may be obtained from an arithmetic mean of the measured insertion losses for connections between the $i^{th}$ input port and all M output ports:

$$\langle I_{ik}^e\rangle=\left(\sum_{k=1}^{M}I_{ik}^e\right)\Big/M\qquad\text{Equation (4)}$$

In the above equations, the notation $I_{kl}^e$ is used to generally denote the experimentally measured insertion losses between a $k^{th}$ input port and a $l^{th}$ output port, and the second term $\langle I_{kl}^e\rangle$ of Equation (3) corresponds to an average value for the N×M pair-wise experimental insertion losses of the N×M switch. This average insertion loss may be given by:

$$\langle I_{kl}^e\rangle=\left(\sum_{k=1}^{N}\sum_{l=1}^{M}I_{kl}^e\right)\Big/2NM\qquad\text{Equation (5)}$$

By analogy, the loss parameter associated with the $j^{th}$ output port ($l_j$) may be represented by an equation similar in form to Equation (3):

$$l_j=\langle I_{kj}^e\rangle-(\tfrac{1}{2})\langle I_{kl}^e\rangle\qquad\text{Equation (6)}$$

The first term $\langle I_{kj}^e\rangle$ in Equation (6) corresponds to an average, or expectation value of the experimental insertion losses that are common to the $j^{th}$ output port. For example, $\langle I_{kj}^e\rangle$ may be obtained from an arithmetic mean of the measured insertion losses for connections between the $j^{th}$ output port and all the N input ports:

$$\langle I_{kj}^e\rangle=\left(\sum_{k=1}^{N}I_{kj}^e\right)\Big/N\qquad\text{Equation (7)}$$

Therefore, loss parameters $l_i$ and $l_j$ can be obtained from average values of experimentally measured insertion losses, as indicated above in Equations (3) and (7). These N+M parameters may be stored in a memory of an on-board controller for the optical cross-connect, and insertion losses for the N×M optical connections can be generated, as needed, from the sum of the corresponding loss parameters for the input and output ports.

Figure 3A:
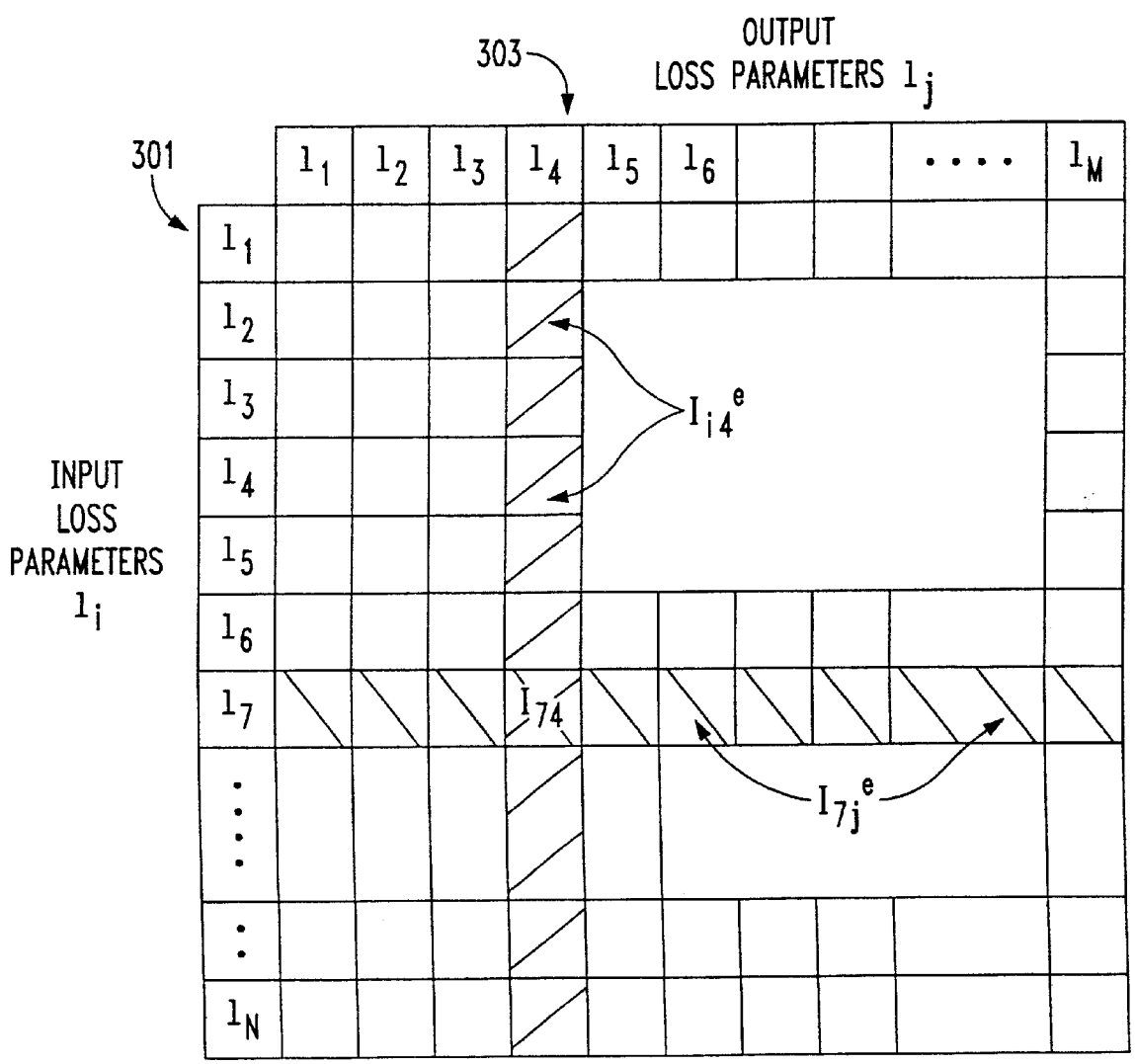
FIG. 3a is a diagram illustrating a reduced loss parameter set according to one aspect of the invention.

The above concept is illustrated in FIG. 3a, which shows a listing 301 of the loss parameters $l_i$, each associated with one of the N input ports, and a listing 303 of the loss parameters $l_j$, each associated with one of the M output ports. A modeled insertion loss $I_{74}$ for a connection between the $7^{th}$ input port and the $4^{th}$ output port is given by the sum of the loss parameters $l_{i=7}$ and $l_{j=4}$. As previously discussed, the loss parameters $l_{i=7}$ and $l_{j=4}$ may be obtained from average values of experimentally measured insertion losses, as indicated in Equations (3)–(7). Thus, insertion losses are measured for connections between the $7^{th}$ input port and all of the M output ports, between the $4^{th}$ output port and all of the N input ports, and for all pair-wise connections between each of the N input ports and each of the M output ports. Average values of these experimental loss measurements ($I_{7j}^e$, $I_{i4}^e$ and $I_{kl}^e$) are then used to derive the loss parameters $l_{i=7}$ and $l_{j=4}$.

The experimentally measured insertion losses are typically obtained during initial factory set-up, referred to as training of the connections, which involves steering the input and output mirrors to obtain a connection with a minimum achievable insertion loss.

According to another embodiment, the loss parameters $l_i$ and $l_j$ may also be derived from a reduced set of experimentally measured insertion losses. For example, to obtain $<I_{ik}^e>$, the average value of insertion losses associated with the $i^{th}$ input port, it may be sufficient to measure insertion losses only for a subset of the M output ports (i.e., between the $i^{th}$ input port and a reduced number, M', of output ports). This can be expressed as:

$$\langle I_{ik}^e \rangle = \left( \sum_k I_{ik}^e \right) \Big/ M' \quad \text{Equation (8)}$$

where $I_{ik}^e$ is summed over k for M' output ports, and M'<M.

Similarly, the other average insertion loss terms may also be obtained from a reduced set of measured insertion losses:

$$\langle I_{kj}^e \rangle = \left( \sum_k I_{kj}^e \right) \Big/ N' \quad \text{Equation (9)}$$

where $I_{kj}^e$ is summed over k for N' input ports, and N'<N;

$$\langle I_{kl}^e \rangle = \left( \sum_k \sum_l I_{kl}^e \right) \Big/ 2N'M' \quad \text{Equation (10)}$$

where $I_{kl}^e$ is summed over k for N' input ports and summed over l for M' output ports.

Thus, in one embodiment, not only can the insertion losses ($I_{ij}$) for all N×M connections in a N×M optical cross-connect be derived from a reduced set (less than N×M) of loss parameters ($l_i$, $l_j$), but the number of experimental measurements required to generate the reduced set of loss parameters ($l_i$, $l_j$) can also be reduced. The number of measurements to be used as subsets for either input ports or output ports should be selected to be a statistically significant sample of the total number of ports, such that the average insertion loss values derived from the subset measurements would have a desired degree of accuracy suitable for specific applications.

Figure 3B:
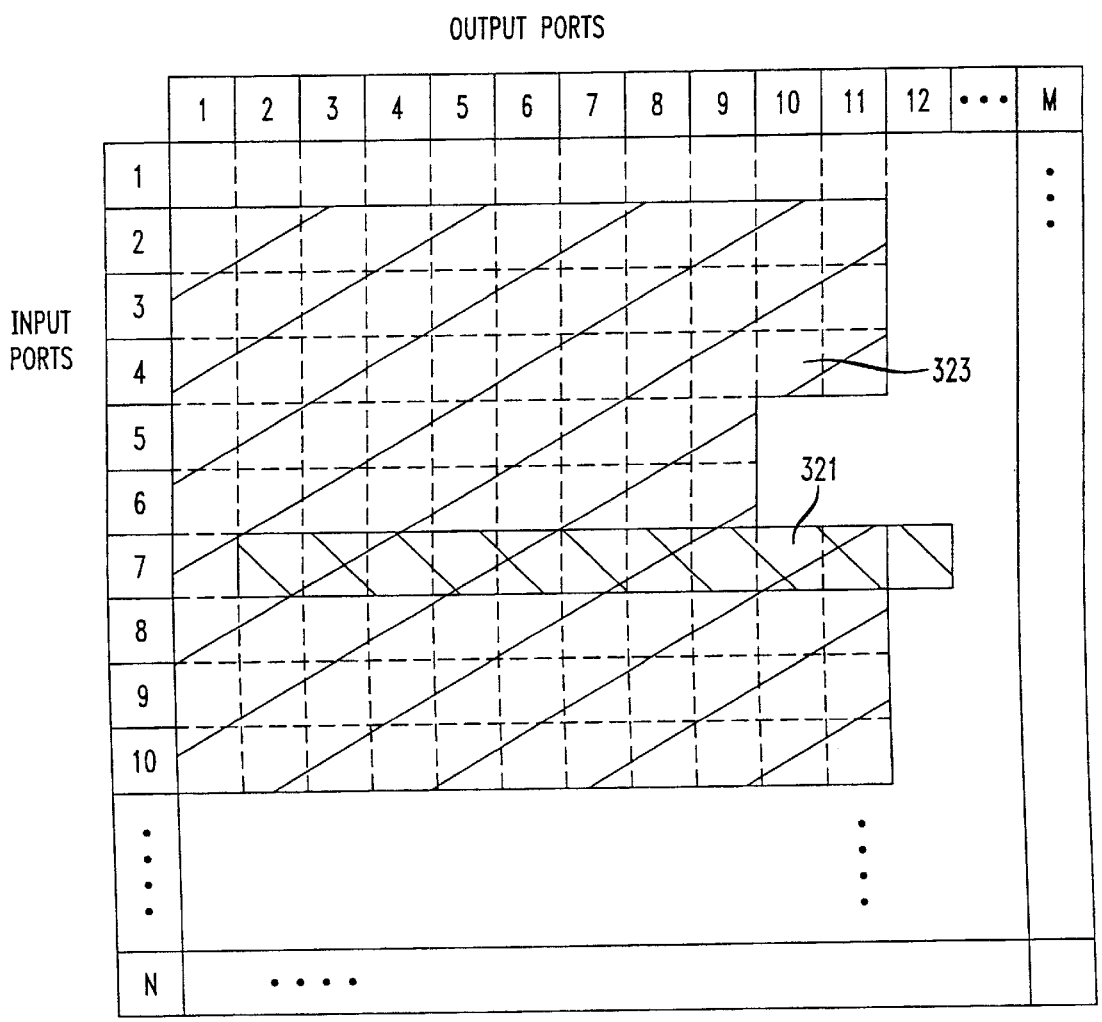
FIG. 3b is a diagram illustrating loss parameter determination according to one aspect of the invention.

An illustration of this concept of reduced measurements is given in FIG. 3b, which depicts a table with the rows representing input ports 1 through N, and the columns representing output ports 1 through M. As an example, the loss parameter $l_{i=7}$ for the $7^{th}$ input port may be determined as follows. According to Equation (8), the $<I_{7k}^e>$ term for the $7^{th}$ input port may be obtained by experimentally measuring insertion losses for connections between the $7^{th}$ input port and a subset of the output ports, e.g., 2nd to 12th output ports. These connections are labeled as 321 in FIG. 3b. An arithmetic mean for the experimentally measured losses, $I_{7k}^e$, where k=2 to 12, is then used to provide the average, or expectation value $<I_{7k}^e>$ of the insertion loss associated with the $7^{th}$ input port.

To obtain $<I_{kl}^e>$, which is the second term in Equation (3) that is needed for the derivation of the loss parameter $l_{i=7}$ for the $7^{th}$ input port, only a subset of experimentally measured insertion losses between the input ports and the output ports is used. This subset of experimental measurements for $I_{kl}^e$ may correspond to insertion loss measurements between a subset of input ports and a subset of output ports (e.g., between input ports 2–4, 7–11 and output ports 1–11; and between input ports 5–6 and output ports 1–9). The connections among these subsets of input and output ports are labeled as 323 in FIG. 3b. The expectation value for the insertion losses $<I_{kl}^e>$ can be obtained from the arithmetic mean of this subset of experimentally measured losses. It is noted that for the purpose of deriving $l_{i=7}$, the subset measurements used to obtain the $<I_{kl}^e>$ term does not have to necessarily include connections for the $7^{th}$ input port. In general, the selections of the number of input or output ports used in these subset measurements vary according to the specific system applications. However, the selected numbers should be sufficient to provide a statistically meaningful sample, in order to achieve a desired degree of accuracy that is appropriate for the specific system or application.

EXAMPLE

As an illustration, the method of the invention is applied to a 4×4 beam steering optical cross-connect. Insertion losses were measured for connections between each of the four input ports and each of the four output ports. These measurements are represented by the following matrix, with the rows corresponding to the input ports and the columns corresponding to the output ports.

$$\begin{pmatrix} 11.90 & 11.05 & 14.64 & 12.98 \\ 12.10 & 13.58 & 16.61 & 15.29 \\ 10.37 & 11.74 & 13.72 & 14.93 \\ 11.13 & 11.48 & 15.65 & 14.95 \end{pmatrix}$$

According to the model of the invention, the loss parameters $l_i$ and $l_j$ for the input and output ports can be obtained by applying Equations (3) and (6) to the experimental measurements represented in the above matrix. Thus, the loss parameters are $l_i$=6.01, 7.77, 6.06 and 6.68, and $l_j$=4.75, 5.33, 8.53 and 7.91, respectively, for the four input and output ports. These eight loss parameters $l_i$ and $l_j$ can be stored as a reduced parameter set or as a loss parameter table, in a memory of an on-board controller of the 4×4 optical cross-connect, and used to generate insertion losses for any of the connection paths as needed. Thus, instead of the conventional practice of storing 16 insertion losses, a reduction in size for the loss parameter table, by a factor of two in this case, is obtained. For an optical cross-connect having a large number of input and output ports, e.g., 100 to 1000, the reduction in the required memory capacity can be significant.

SYSTEMS APPLICATIONS

Embodiments of the invention can be applied to improve various operational and maintenance aspects of the optical cross-connect. For example, the reduced loss parameter set may be used to generate modeled insertion losses to aid in the training of connections in an optical cross-connect. For example, prior to installation of the optical cross-connect, system training is performed in a factory to provide component settings for achieving connections with minimum insertion losses. According to conventional procedures, training of the optical cross-connect requires experimental measurements of all the pair-wise insertion losses for the entire set of input and output ports. Such training of an individual connection involves, for example, adjusting the input and the output mirrors, each with its two degrees of freedom, to locate proper mirror orientations to achieve a minimum loss connection. Such a training procedure can be quite time-consuming because it requires searching through the 4-dimensional parameter space for each of the pairs of input and output mirrors.

However, by applying embodiments of the invention, the training procedure can be performed with increased speed and accuracy. For example, a modified training procedure may involve initially measuring insertion losses only for connections between a subset of input and a subset of output ports. Loss parameters ($l_i$, $l_j$) may then be generated from the reduced set of measured insertion losses. Based on the loss parameters ($l_i$, $l_j$), modeled insertion losses can be derived for the complete set of N×M connections. These modeled insertion losses are used as reference values for subsequent training of other connections. For example, a measured insertion loss for an "untrained" connection can be compared with the modeled insertion loss, and the mirrors can be steered to minimize the deviation between the two values. Thus, instead of having to steer the mirrors through the entire parameter space to locate the absolute minimum (as opposed to a local minimum) insertion loss, the modified procedure allows the training to be accomplished with improved speed and accuracy, by providing a reference value for the minimum insertion loss. For example, once the mirrors are steered to certain orientations that produce an insertion loss that is reasonably close to the reference value, then the training for that connection can be considered complete, without the need to scan the mirrors through the remaining parameter space. What is considered "reasonably close" usually depends on the quality or degree of accuracy of the training that is desired for the specific application. Optical cross-connects with large port counts will benefit significantly from such an improved training procedure. For a cross-connect with 1000 input and 1000 output ports, for example, it may be sufficient to measure insertion losses for a subset of 100 input and 100 output ports. That is, only $10^4$ measurements, instead of $10^6$, are necessary for the generation of 2000 loss parameters $l_i$ and $l_j$, which can be used to provide modeled insertion losses for all the $10^6$ possible connections.

Trouble-shooting and maintenance of the optical cross-connect can also benefit from practicing the method of the invention. For example, referring back to FIG. 2, two of the components in a connection path of the optical cross-connect 200 are input or output interfaces 204, 256. Among the functions of the input and output interfaces 204, 256 is the monitoring and measurements of input and output optical powers for the input and output ports 202, 258. From the measured optical powers, insertion losses can be determined for individual optical connections. These insertion loss measurements can be compared to model values derived from the insertion loss parameters $l_i$ and $l_j$. Any deviation between a measured insertion loss and the model value may be used as a problem indicator for the specific connection. For example, outliers from the modeled loss values may be used to identify connections that require further training. On the other hand, a measured insertion loss that has minimum deviation from the modeled value may also be used as a verification for a good connection.

Furthermore, should a component replacement be required in any of the connections, the modeled insertion losses can also be used as references for system re-calibration with the newly replaced component. As an example, assume that only one input circuit pack (e.g., associated with the $6^{th}$ input port) containing a variety of optical or electronic components has to be replaced in the field. Conventional re-calibration procedure would require measurements of the insertion losses for all connections between the $6^{th}$ input port and all output ports, since the loss characteristics for all connections associated with the $6^{th}$ input port will be changed.

However, according to one embodiment, only a subset of insertion loss measurements involving the $6^{th}$ input port and any subset of output ports (assuming that none of the output port is replaced) would be necessary to allow system re-calibration. In general, the subset of output ports should represent a statistically significant sample of the total number of output ports. This subset of measured insertion losses, along with the known (e.g., previously determined during factory setup) loss parameters for input and output ports that do not have replaced components, would allow a loss parameter $l_{i=6}$ to be determined for the $6^{th}$ input port with the new input circuit pack. Insertion losses for other connections associated with the $6^{th}$ input port can subsequently be predicted from the model, without the need to re-measure losses for all the associated connections. Although this example involves only one input port with a replaced circuit pack, such a procedure can readily be extended to re-calibration of a system having one or more input or output ports with replaced circuit packs. Re-calibration of optical cross-connects with large port counts will greatly benefit from practice of the invention.

Although in the above discussions, an assumption is made in Equation (2) that $\epsilon_{ij}$, the loss term associated with a specific connection, is negligible, the concept of the invention is nonetheless applicable to situations in which $\epsilon_{ij}$ is not negligible. There are various scenarios that may result in non-negligible $\epsilon_{ij}$ terms. Possible sources for non-negligible $\epsilon_{ij}$ terms may include geometric effects such as losses due to optical beams overfilling optical components; or dispersion-induced defocusing—i.e., changes in focal distances as a function of wavelength, which may be encountered in switches designed for operating within a wide wavelength range. In additional, non-negligible $\epsilon_{ij}$ terms may also arise in cases where defects may exist on certain "field" components (e.g., lenses), which may be present between the input and output mirrors of a connection.

In these and other situations, if the connection-dependent loss term $\epsilon_{ij}$ for a specific connection can be estimated or predicted, then the model may be modified accordingly to account for the $\epsilon_{ij}$ term, and a reduced loss parameter set can be generated for the determination of insertion losses.

Although several preferred embodiments which incorporate the teachings of the present invention have been shown and described in detail, those skilled in the art can readily devise many other varied embodiments that still incorporate these teachings.

What is claimed is:

1. A method of deriving insertion losses for a single-stage optical cross-connect having at least one input port, N, and at least one output port, M, comprising:

(a) providing N loss parameters each of which is associated with one of the N input ports;

(b) providing M loss parameters each of which is associated with one of the M output ports; and (c) deriving a modeled insertion loss for a connection between an $i^{th}$ input port and a $j^{th}$ output port by adding the loss parameter for the $i^{th}$ input port to the loss parameter for the $j^{th}$ output port;

wherein N and M are positive integers, i is a positive integer not greater than N, and j is a positive integer not greater than M.

2. The method of claim 1, wherein N is equal to M.

3. The method of claim 1, wherein the loss parameter for the $i^{th}$ input port is obtained by:

(c1) measuring insertion losses between the $i^{th}$ input port and at least a first subset of the output ports;

(c2) obtaining an average insertion loss for the $i^{th}$ input port by calculating an arithmetic mean of the insertion losses measured in (c1);

(c3) measuring pair-wise insertion losses between each of a subset of the input ports and each of a second subset of the output ports;

(c4) obtaining an average pair-wise insertion loss among the subset of the input ports and the second subset of the output ports by calculating an arithmetic mean of the pair-wise insertion losses measured in (c3); and (c5) subtracting one-half of the average pair-wise insertion loss obtained from (c4) from the average insertion loss for the $i^{th}$ input port obtained from (c2).

4. The method of claim 3, wherein the first subset of the output ports is the same as the second subset of the output ports.

5. The method of claim 3, wherein the loss parameter for the $j^{th}$ output port is obtained by:

(c6) measuring insertion losses between the $j^{th}$ output port and at least a first subset of the input ports;

(c7) obtaining an average insertion loss for the $j^{th}$ output port by calculating an arithmetic mean of the insertion losses measured in (c6); and (c8) subtracting one-half of the average pair-wise insertion loss obtained from (c4) from the average insertion loss for the $j^{th}$ output port obtained in (c7).

6. The method of claim 5, wherein the first subset of the input ports is same as the second subset of the input ports.

7. The method of claim 5, further comprising:

(d) storing the N loss parameters for the input ports and the M loss parameters for the output ports in a controller for the optical cross-connect.

8. The method of claim 7, wherein the single-stage optical cross-connect is based on free-space beam-steering optics.

9. A method of connection verification in a single-stage optical cross-connect having at least one input port, N, and at least one output port, M, comprising:

(a) providing N loss parameters each of which is associated with one of the N input ports;

(b) providing M loss parameters each of which is associated with one of the M output ports;

(c) generating modeled insertion losses for one or more connections between any $i^{th}$ input port and any $j^{th}$ output port by adding the loss parameter for the $i^{th}$ input port to the loss parameter for the $j^{th}$ output port; and (d) using the modeled insertion losses from (c) as references for verifying connection conditions in the optical cross-connect;

wherein N and M are positive integers, i is a positive integer not greater than N, and j is a positive integer not greater than M.

10. The method of claim 9, wherein (d) further comprises:

(d1) establishing a connection between any $i^{th}$ input port and any $j^{th}$ output port;

(d2) measuring an insertion loss for the connection in (d1);

(d3) adjusting the connection established in (d1) to minimize a difference between the measured insertion loss and the modeled insertion loss.

11. The method of claim 10, wherein the single-stage optical cross-connect is based on free-space beam-steering optics.

12. The method of claim 11, wherein each of the input ports comprises an input interface connected to an input fiber coupled to an input lens and an input mirror; and each of the output ports comprises an output interface connected to an output fiber coupled to an output lens and an output mirror.

13. The method of claim 12, wherein the connection between any $i^{th}$ input port and any $j^{th}$ output port is established by:

(i) launching an optical signal into the input interface;

(ii) propagating the optical signal from the input interface through the input fiber;

(iii) using the input lens, directing the optical signal from the input fiber to the input mirror;

(iv) steering the input mirror to direct the optical signal onto the output mirror;

(v) directing the optical signal from the output mirror to the output lens;

(vi) coupling the optical signal from the output lens into the output fiber; and (vii) directing the optical signal to the output interface.

14. A method of system relibration for an optical cross-connect with at least one input port, N, and at least one output port, M, each having an associated insertion loss, comprising:

(a) measuring insertion losses for connections between the N input ports and a number (K) of output ports, wherein K is a positive integer less than or equal to M;

(b) providing previously determined loss parameters for the number (K) of output ports;

(c) deriving a loss parameter for each of the N input ports using the measured insertion losses; and (d) determining model insertion losses for all connections between each of the N input ports and all of the M output ports.

15. A method of system re-calibration for an optical cross-connect with at least one input port, N, and at least one output port, M, each having an associated insertion loss, comprising:

(a) measuring insertion losses for connections between the M output ports and a number (K) of input ports, wherein K is a positive integer less than or equal to N;

(b) providing previously determined loss parameters for the number (K) of input ports;

(c) deriving a loss parameter for each of the M output ports using the measured insertion losses; and (d) determining model insertion losses for all connections between each of the M output ports and all of the N input ports.

16. A method of training connections in a single-stage optical cross-connect having at least one input port N, and at least one output port, M, where each of the N input ports and M output ports comprises beam-steering optics, comprising:

(a) providing N loss parameters each of which is associated with one of the N input ports;

(b) providing M loss parameters each of which is associated with one of the M output ports;

(c) deriving a modeled insertion loss for any connection between any $i^{th}$ input port and any $j^{th}$ output port by adding the loss parameter for the $i^{th}$ input port to the loss parameter for the $j^{th}$ output port;

(d) establishing a connection between the $i^{th}$ input port and the $j^{th}$ output port;

(e) monitor a measured insertion loss for the connection in (d); and (f) optimizing alignment conditions for the beam-steering optics between the $i^{th}$ input port and the $j^{th}$ output port by minimizing a difference between the measured insertion loss and the modeled insertion loss for the connection between the $i^{th}$ input port and the $j^{th}$ output port;

wherein N and M are positive integers, i is a positive integer not greater than N, and j is a positive integer not greater than M.

17. An optical communication system comprising:

a single-stage optical cross-connect having at least one input port, N, and at least one output port, M, where N and M are positive integers;

a controller for storing N input loss parameters each associated with one of the input ports and M output loss parameters each associated with one of the output ports;

wherein a modeled insertion loss for a connection between any $i^{th}$ input port and any $j^{th}$ output port is given by the sum of the input loss parameter associated with the $i^{th}$ input port and the output loss parameter associated with the $j^{th}$ output port; wherein i is a positive integer not greater than N and j is a positive integer not greater than M.

18. The optical communication system of claim 17, wherein the single-stage optical cross-connect is based on free-space steerable optics.

19. The optical communication system of claim 18, wherein each of the input ports comprises an input interface connected to an input fiber coupled to an input lens and an input mirror, and each of the output ports comprises an output interface connected to an output fiber coupled to an output lens and an output mirror.

20. The optical communication system of claim 19, wherein the connection between an $i^{th}$ input port and a $j^{th}$ output port, where i is a positive integer not greater than N and j is a positive integer not greater than M, is established by:

(a) launching an optical signal into the $i^{th}$ input interface;

(b) propagating the optical signal from the $i^{th}$ input interface through the $i^{th}$ input fiber;

(c) using the $i^{th}$ input lens, directing the optical signal from the $i^{th}$ input fiber to the $i^{th}$ input mirror;

(d) steering the $i^{th}$ input mirror to direct the optical signal onto the $j^{th}$ output mirror;

(e) directing the optical signal from the $j^{th}$ output mirror to the $j^{th}$ output lens;

(f) coupling the optical signal from the $j^{th}$ output lens into the $j^{th}$ output fiber; and (g) directing the optical signal to the $j^{th}$ output interface.

* * * * *